United States Patent [19]

Sauer et al.

[11] 3,800,421
[45] Apr. 2, 1974

[54] DIE LAYOUT APPARATUS

[75] Inventors: Louis E. Sauer; Orville C. Miller, both of St. Louis, Mo.

[73] Assignee: Centenary Central Inc., St. Louis, Mo.

[22] Filed: Dec. 26, 1972

[21] Appl. No.: 318,229

[52] U.S. Cl. .......................................... 33/22, 33/78
[51] Int. Cl. ............................................ B43l 13/10
[58] Field of Search ............ 33/184.5, 78, 21 R, 22, 33/23 R, 18 C, 20 C, 77

[56] References Cited
UNITED STATES PATENTS 3,345,749  10/1967  Devon .................................... 33/22
2,733,510  2/1956  Darago .................................. 33/23 R Primary Examiner—Harry N. Haroian
Assistant Examiner—John W. Shepperd
Attorney, Agent, or Firm—Rogers, Ezell & Eilers

[57] ABSTRACT

An apparatus for laying out a pattern upon a rotary die board. The apparatus includes a measuring member bearing a plurality of scales differing correspondingly respectively to different predetermined degrees of foreshortening. An indicator traverses the measuring member in response to axial rotation of the arcuate die board.

8 Claims, 8 Drawing Figures

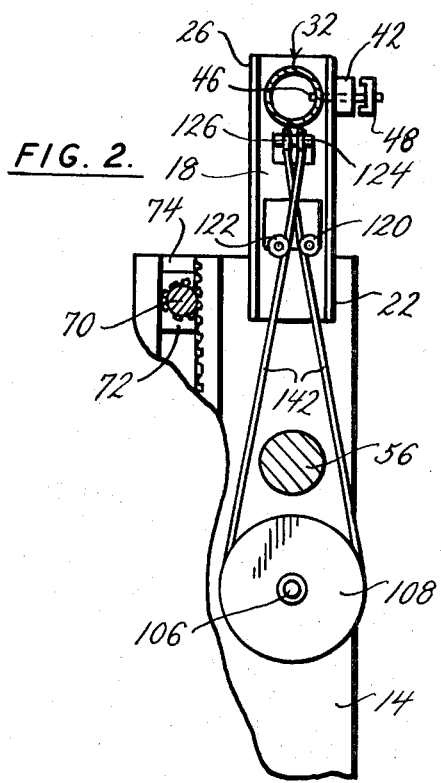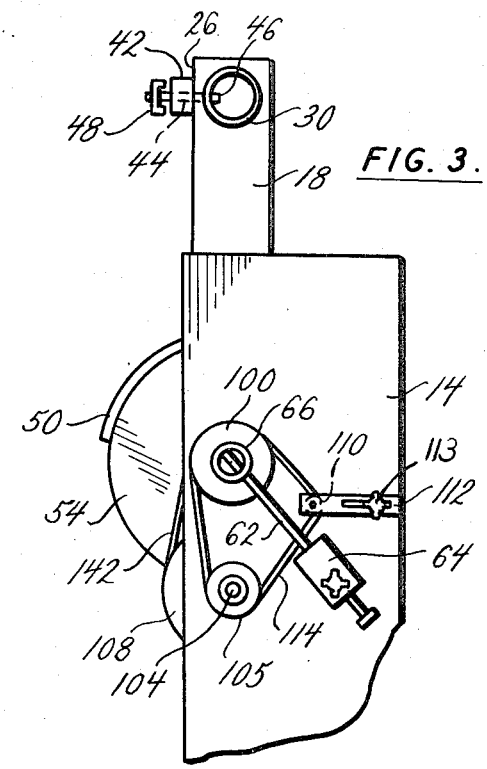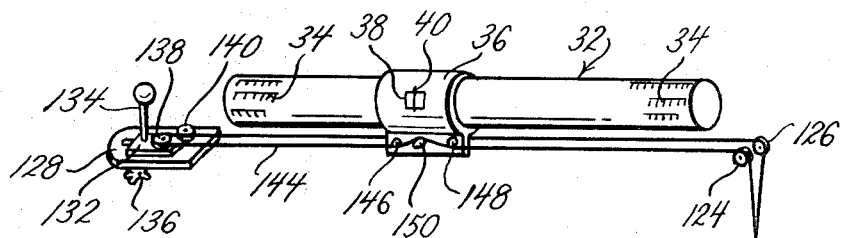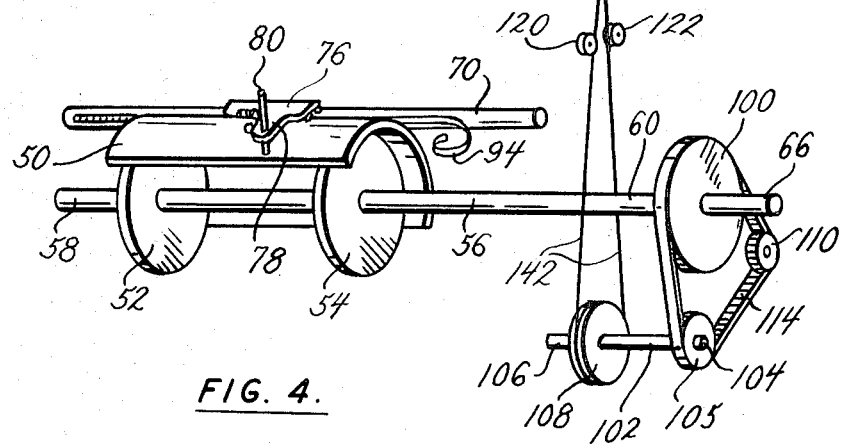

DIE LAYOUT APPARATUS

BACKGROUND OF THE INVENTION

The present invention relates generally to rotary die cutting and more particularly to a machine for laying out a pattern upon an arcuate die board, whereupon the board may be worked, as by sawing or drilling, to receive cutting rule. The cutting rule extends radially outwardly from the surface of the arcuate die board; hence, circumferential distances between cutting edges of the cutting rule normally will be greater than the distances between corresponding points where the cutting rule intersects the surface of the die board. Thus, circumferential distances between points of intersection of a cutting rule with the arcuate die surface must ordinarily be slightly less than the corresponding die design distance measured circumferentially of the board, and also less than the corresponding distances measured on the desired product to be produced.

The art has accordingly attempted to provide means for accurately estimating the differences between distances as measured on a die pattern and corresponding circumferential distances between points of intersection of cutting rule and an arcuate die surface. For example, in applicants' U.S. Pat. No. 3,498,716, means are described for deriving a pattern containing foreshortened circumferential distances from an actual pattern of the planned product. U.S. Pat. No. 3,664,030 attempts to solve the problem by employing, at one end of the arcuate die, a disk having a true measurement circumferential scale about its periphery, the diameter of the scale on the disk being the same as the diameter of the sharpened edges of cutting rule to be mounted on the die surface. In the last-mentioned pattern, during the pattern-making operation, true circumferential distances along the pattern of the desired product are measured along the circumferential scale using a pointer which traverses the scale and a scribe which moves with the pointer and which is directed radially inward toward the axis of rotation of the die. Since the diameter of the circle described by the edges of cutting rule is somewhat greater than that described by the die board surface, circumferential distances measured along the true circumferential measuring scale will be translated into proportionately shorter distances scribed on the surface of the die board.

In rotary die cutting art, sheets of cardboard or other workpiece material are fed between oppositely rotating die and anvil members. It is known that during the cutting operation, the outwardly-extending segments of cutting rule normally extend into, and often actually cut into the surface of a corresponding anvil. As such, the circumferential distance between the cutting edges of cutting rule is not necessarily exactly the same as the corresponding circumferential distance measured on the cut product. Experience has shown that trial-and-error methods must still be used for proper circumferential placement of cutting rule on a rotary die surface. In other words, the degree of foreshortening of actual circumferential distances is dependent not only upon the respective diameters of the die board and of the cutting edges of the cutting rule extending outwardly therefrom, but is dependent also upon the type of material to be cut, the speed of operation of the cutting machine, the depth to which the cutting rule extends into the associated anvil surface, the diameter of the rotary die, etc. One experienced in rotary die cutting, however, may predict with sufficient accuracy the degree of foreshortening which should be used when the various parameters listed above are known.

SUMMARY OF THE INVENTION

It is a general object of the invention to provide an apparatus for laying out a die design upon an arcuate work piece with readily selected predetermined degrees of foreshortening.

It is another object of the present invention to provide an apparatus for laying out designs on arcuate work pieces wherein foreshortened circumferential distances are measured by reference to measuring scales adapted to provide predetermined degrees of foreshortening.

It is another object of the invention to provide a design lay-out apparatus for rotary dies which employs a plurality of selectable circumferential distance scales differing from a true length scale by different degrees of foreshortening.

It is yet another object of the invention to provide a design lay out apparatus for rotary dies wherein the desired degree of foreshortening may readily be selected and wherein compensation for dies of varying diameters can be easily made.

In general, the present invention relates to an apparatus for laying out a pattern upon an axially rotatable arcuate die work piece mounted upon a rotatable shaft, which includes means for physically applying the pattern to the work piece. The invention is characterized by the improvement which comprises circumferential measuring means for automatically measuring foreshortened circumferential distances on the die surface. The circumferential measuring means comprises a measuring member bearing a plurality of different scales each having distance indicia thereon corresponding to predetermined foreshortened circumferential distances on the die surface. The circumferential measuring means also includes indicating means responsive to axial rotation of the arcuate work piece to traverse the measuring member and indicate circumferential design distances thereon. The measuring member is preferably an elongated member bearing a plurality of longitudinal scales, and most preferably is a rotatable, elongated tubular member bearing axially extending longitudinal scales about its circumference.

In the drawing:

FIG. 2 is a cross sectional view partially broken away, taken along the line 2—2 of FIG. 1;

FIG. 3 is a side view, partially broken away, showing the right end of the apparatus depicted in FIG. 1;

FIG. 4 is a schematic, perspective view of the apparatus of the invention;

DESCRIPTION OF THE PREFERRED EMBODIMENT

It its preferred embodiment, the apparatus of the present invention is adapted for mounting to the rotary die sawing and drilling machine described in applicants' U.S. Pat. No. 3,507,179. The supporting structure of the machine, and structure relating to the mounting or arcuate workpieces in the machine, sawing and drilling devices and the like are described in detail in that patent, and the same is incorporated herein by reference. This patent describes a rotary die sawing and drilling machine having supporting side frame structure between which are rotatably mounted shafts adapted to carry axially-spaced disks upon which an arcuate die workpiece may be mounted, and a shaft parallel thereto upon which may be slidably mounted a sawing or drilling tool or the like.

Figure 1:
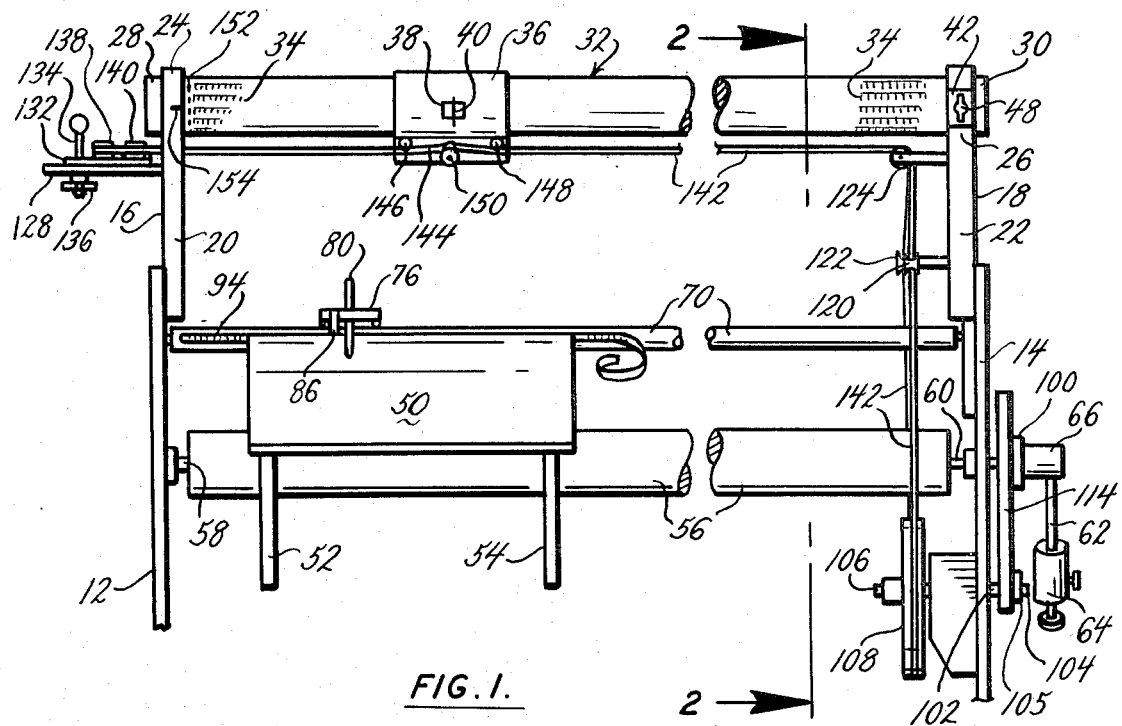
FIG. 1 is an elevational view of the die layout machine, shown partially broken away.
Figure 8:
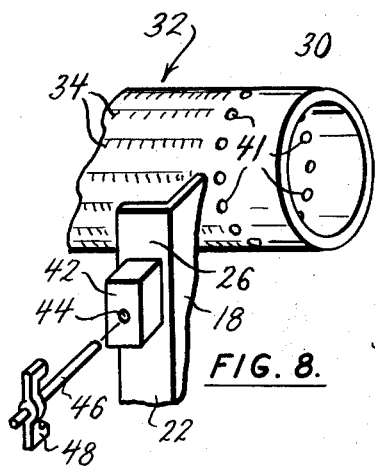
FIG. 8 is a perspective, fragmentary view of an indexing device shown also in FIG. 1.

The side frames of the machine shown in U.S. Pat. 3,507,179 are depicted in FIGS. 1, 2 and 3 of the drawing hereof as 12 and 14 respectively. Mounted by bolts or the like to side frames 12 and 14 are upwardly extending mounting frame channels 16 and 18 having inwardly extending flanges 20 and 22. The upper ends 24 and 26 have apertures therethrough to rotatably receive the ends 28 and 30 of a tubular, longitudinal measuring member shown generally as 32 and which bears a plurality of different longitudinal scales along its length. These scales are designated generally as 34 in FIGS. 1, 4 and 8 and are shown in more detail in FIG. 7, as will be subsequently explained. A relatively short sleeve member 36 is slidably mounted about the tubular longitudinal measuring member 32 and has a central window 38 therein through which a selected scale along the length of the tubular member may be viewed. Window 38 is provided with a vertical hair-line 40 so that the precise scale reading corresponding to the lateral position of the sleeve 36 along the tubular member 32 may be read. Indexing holes, designated generally as 41 (FIG. 8) are located about the periphery adjacent one end 30 of the tubular scale member. Carried by the upper end 26 of flange member 22 is a small supporting block 42 having an orifice 44 therethrough and carrying therewithin retractable pin member 46 having handle portion 48, the pin member being adapted to extend through orifice 44 and through an orifice (not shown) in the channel member 22 and thence into registry with one of the indexing holes 41 adjacent the end of the tube member. Mounting block 42 may be equipped with a spring retainer such that the pin may be retracted against spring pressure, permitting the tube member to rotate so as to bring a different, selected indexing hole into registry with the pin member, whereupon the pin member may be released to enter the selected indexing hole to hold the tube member from further rotation. The holes 41 are arranged about the periphery of the tubular measuring member such that when the pin 46 is in registry with a selected hole 41, a predetermined longitudinal scale will be in registry with the window 38 of sleeve member 36.

As described in U.S. Pat. No. 3,507,179, and as best shown in FIGS. 1 and 4 hereof, an arcuate workpiece 50 is circumferentially mounted upon disk members 52 and 54 by screws or the like, which disk members in turn are carried upon rotatable shaft 56. The ends 58 and 60 of the shaft 56 are journalled into side frames 12 and 14 of the machine such that rotation of the shaft causes the workpiece to rotate about its axis of rotation. Since the workpiece 50 ordinarily does not extend completely about the periphery of disks 52 and 54, its weight is counterbalanced by means of shaft 62 and movable weight 64 which are mounted radially to an end 66 of the shaft 56 which extends through frame member 14, as shown best in FIGS. 1 and 3.

Shaft 70 (FIGS. 1, 2 & 4) extends laterally between side frames 12 and 14 parallel to but behind and above shaft 56. The ends of shaft 70 are provided with geared end sections mounted in bearing blocks 72 which may slide vertically in channels 74, the geared ends cooperating in rack and pinion fashion with teeth along an inner surface of channel 74 such that shaft 70 can be moved up and down, all as shown in U.S. Pat. No. 3,507,179. Shaft 70 is employed to carry a measuring and marking instrument, or a saw or drill device, as shown in said patent.

Figure 6:
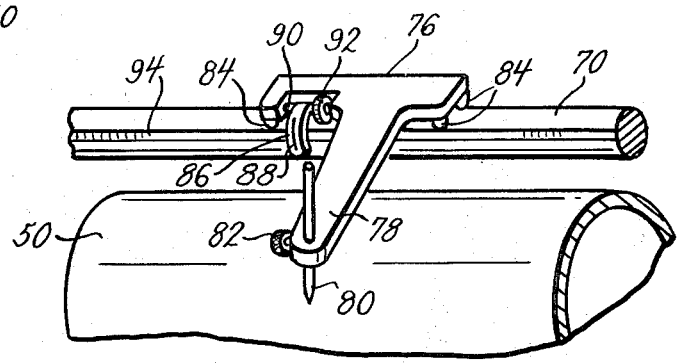
FIG. 6 is a perspective view of a scribing device shown also in FIG. 1 and 4.

Referring now to FIG. 6 herein, a scribe holder 76, having an elongated neck portion 78, is provided with feet 84 on its lower surface which are adapted to ride upon shaft 70. Elongated neck portion 78 is provided with an orifice therethrough in which may be mounted a scribing instrument 80 such as pencil or pen locked in position with thumbscrew 82. The scribe holder 76 is provided with a depending, transparent viewing lens 86 having a vertical hairline 88, the lens being supported on the scribe holder by means of pin 90 having a manually turnable knob 92. The pin 90 is threaded into the scribe holder such that manual rotation of the knob 92 causes the lens and hairline 86 and 88 to move longitudinally of the shaft 70 a short distance.

To measure horizontal distances on the workpiece 50 traversed by the scribe 80, the shaft 70 is provided with a ruler 94 along its length, which in a preferred embodiment may take the form of a removable length of magnetized tape having distance markings thereon. Scribe holder 76 is preferably of sufficient weight, and the feet 84 thereof preferably engage the surface of shaft 70 with sufficient friction, so that the workpiece 50 may be rotated about its axis of rotation to cause a circumferential line to be drawn on the workpiece surface without affecting the position of the scribe holder 76 along shaft 70. The distance which the scribe traverses horizontally on the surface of the workpiece may be measured by viewing the distance markings on rule 94 through lens 86.

Sliding sleeve 36 is adapted to traverse the tubular longitudinal measuring member in response to rotation of the workpiece 50 about its axis of rotation. In the preferred embodiment, a portion of shaft 56 extends through side frame 14 of the apparatus, as noted above, and the extended end is provided with a timing gear 100 as shown in FIGS. 1, 3 and 4. Extending also through side frame 14 is a shaft 102 bearing on its outer extremity 104 a removable timing gear 105 aligned with timing gear 100, and bearing on its inner extremity 106 a sheave 108. A take-up pulley 110 is attached to laterally moveable slotted bar 112 which in turn is mounted to an outer surface of side frame 14 by handscrew 113. A toothed timing belt 114 connects timing gears 100 and 105 and pulley 110, the latter serving to maintain the belt in a taut condition. It will thus be seen that rotational movement of the workpiece 50 rotates timing gears 100 and 105, movement of the latter gear also serving to rotate sheave 108.

Figure 5:
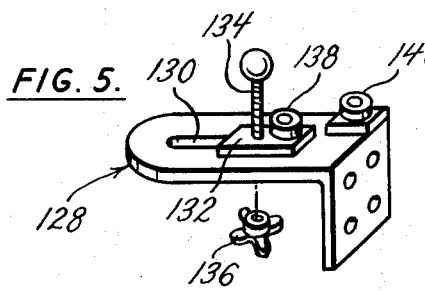
FIG. 5 is an enlarged view of a cord tensioning device partially shown also in the upper left-hand portion of FIG. 4.

Carried by channel member 18 are pairs of small pulleys 120, 122 and 124, 126. Mounted to the outer surface of channel member 16 is an outwardly extending projection 128 having an outwardly extending slot 130 therewithin. Bearing block 132 (FIG. 5) is movably attached to extension 128 by manually operable screw 134 which passes through the bearing block and through slot 130 and upon which is threaded nut 136. Mounted to the top surface of bearing block 132 is pulley 138. Mounted to projection 128, in horizontal registration with but inwardly of pulley 138 is pulley 140.

Pulley cord 142, which may be of aircraft cable or other relatively non-stretchable material, passes around sheave 108 and thence upwardly between pulleys 120 and 122, thence around pulleys 124 and 126, and thence laterally through a small orifice suitably located in channel member 16 and around pulley 138, such that movement of bearing block 132 in an outwardly direction pulls the pulley cord taut about said pulleys and sheave. The frontmost portion 144 of the laterally extending pulley cord passes beneath pins 146 and 148 of sleeve member 36, and is held to the sleeve member by thumbscrew 150, whereby the position of sleeve member 36 with respect to a pulley cord may be set without movement of the pulley cord merely by loosening the thumbscrew and sliding the sleeve member to a new position.

Figure 7:
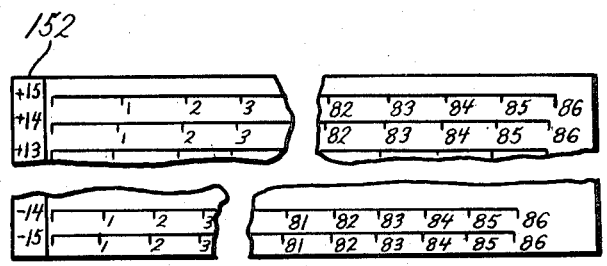
FIG. 7 is a projected, fragmentary view of a longitudinal measuring member of the apparatus of the present invention.

Tubular longitudinal measuring member 32 may be made from a length of suitable tubing material, such as aluminum, and the longitudinally extending scales thereon may be provided by wrapping the tubular member with a sheet of paper or the like bearing the appropriate scales. For ease of understanding, FIG. 7 depicts the scales carried by the tubular member in projected form, as the scales might be carried on a sheet of paper or the like to be wrapped about the section of tubing. The scales depicted in FIG. 7 are each provided with an index number near the left-hand end 152 (or right-hand end) thereof. As depicted, each scale represents distance measurements which are slightly shorter than those of the scale next above it. Each scale is thus selected for a certain degree of foreshortening of the design to be applied to the surface of the workpiece 50. By disengaging pin 46 of frame channel 18 and then rotating the tube, different scales will appear in the viewing window 38 of sleeve member 36. The desired scale is set by rotating the tubular member until the correct index number appears opposite mark 154 on flange 20 of the mounting frame channel 16. The diameters of sheave 108 and of timing gears 100 and 105 are preferably, but not necessarily, so chosen that when the workpiece 50 is rotated about its axis, the circumferential distance measured on the imaginary cylindrical surface about the workpiece representing the outwardly extending edges of cutting rule is the same as the actual distance travelled by sleeve member 36 along the tubular elongated measuring member 32. It will be understood, of course, that the diameters of any of sheave 108, and timing gears 100 and 105 may be changed, with a corresponding change in the spacing of the longitudinal scales 34.

Since workpieces vary in diameter from one to another, timing gear 100 is made easily replaceable so that the relationship between circumferential surface distance on the workpiece to be scribed and the distance of travel of sleeve 36 along the elongated measuring member 32 may be maintained constant by judicious selection of the appropriate timing gear 100. For example, if a workpiece having a diameter twice that of the previous workpiece were to be scribed, then a timing gear 100 having twice the number of teeth of the previous timing gear would be employed. Timing gear 100 may be held on shaft 66, for example, by means of a thumbscrew or the like (not shown) passing through the hub of this gear and bearing on the shaft.

In operation, one pre-selects the desired degree of foreshortening and rotates the elongated measuring member until the proper scale for the selected degree of foreshortening appears in the window 38 of sleeve 36 indicator mark 154 pointing to the proper index number on end 152. An arbitrary starting point on the workpiece surface (e.g., near the top, left edge thereof) is selected, and the scribe holder and workpiece are moved so that the scribe is directly upon the chosen starting point. Magnetized tape 94 is affixed magnetically upon shaft 70 so that the zero point of the tape scale is approximately under hairline 88 of the scribe holder 76. Knob 92 of the scribe holder is turned so as to position the hairline precisely over the zero point on the tape. Thumbscrew 150 of sliding sleeve member 36 is loosened, and the sleeve member is moved along the elongated measuring scale until the zero point on the scale is precisely beneath hairline 40, whereupon the thumbscrew 150 is retightened. Horizontal and circumferential distance values are derived from a pattern of the product to be made. Horizontal distances are scribed by movement of the scribe holder along the shaft 70, horizontal distances on the pattern translating exactly into horizontal distances on the magnetized tape 94 as viewed through lens 86. Circumferential distances are scribed on the workpiece by manually rotating the workpiece about its axis. Circumferential distances, however, are foreshortened during translation thereof into distances circumferential of the workpiece 50. If, for example, a vertical distance of 8.0 inches is derived from the pattern of the finished product, then one rotates the workpiece until the hairline 40 of the sliding sleeve 36 has traversed eight inch indications on the scale appearing in window 38. The actual distance scribed circumferentially on the workpiece hence will be somewhat less than eight inches.

It will be understood that a drilling or sawing apparatus as disclosed in U.S. Pat. No. 3,507,179 is moved out of the way to one end of the shaft 70 during the pattern laying-out operation. It will also be understood that changes may be made in the nature of the mechanical coupling serving to traverse sleeve 36 along the longitudinal measuring member in response to rotation of the workpiece.

The foregoing description and the accompanying drawings have been given by way of illustration and example. Changes in form of the elements, rearrangement of parts, and substitution of equivalent elements which will be obvious to those skilled in the art, are contemplated as within the scope of the present invention which is limited only by the claims which follow.

We claim:

1. In an apparatus for laying out a pattern upon an arcuate die workpiece mounted upon a rotatable shaft which includes means for physically applying the pattern to the workpiece, the improvement which comprises circumferential measuring means for automatically measuring foreshortened circumferential distances on said workpiece, said circumferential measuring means comprising a measuring member bearing a plurality of different distance scales corresponding respectively to different degrees of circumferential foreshortening, and indicator means operatively coupled to said workpiece and adapted to traverse said measuring member to indicate design distances thereon in response to axial rotation of said arcuate die workpiece.

2. The apparatus of claim 1 wherein said measuring member comprises an axially rotatable, elongated tubular member bearing said distance scales axially about its circumference, whereby rotation of the tubular member to a predetermined position affects registration of the indicating means with a desired distance scale on the tubular member.

3. In an apparatus for laying out a pattern upon an arcuate die workpiece mounted upon a rotatable shaft which includes means for physically applying the pattern to the workpiece, the improvement which comprises circumferential measuring means for automatically measuring foreshortened circumferential distances on the workpiece surface, said circumferential measuring means comprising a longitudinal measuring member axially bearing a plurality of different distance scales about its circumference corresponding respectively to different degrees of circumferential foreshortening, indicator means adapted to traverse said measuring member to indicate design distances thereon, and motion transmitting means coupling said indicator means and said arcuate workpiece and adapted to traverse said indicator means axially of said longitudinal measuring member in response to axial rotation of the workpiece.

4. The apparatus of claim 3 wherein said longitudinal measuring member comprises an axially rotatable tubular member bearing said distance scales axially about its circumference, whereby rotation of said tubular member to a predetermined position affects registration of said indicating means with a desired scale on said tubular member.

5. The apparatus of claim 3 wherein said motion transmitting means includes a sheave rotatable in response to axial rotation of the workpiece, and cordage attached to said indicating means in passing about said sheave, the relationship between said indicating means, said cordage and said sheave being such as to cause said indicating means to traverse the longitudinal measuring member in response to axial rotation of the workpiece.

6. The apparatus of claim 3 including a timing belt and gears cooperating therewith, one such gear being coupled to and rotatable with said workpiece, and a second such gear being coupled operatively to said indicator means to cause the latter to traverse the longitudinal measuring member upon rotation thereof, said gears being joined by said timing belt.

7. The apparatus of claim 6 including a sheave coupled to said second gear and rotatable therewith, and cordage passing about said sheave and joined to said indicating means whereby said indicating means is caused to traverse the longitudinal measuring member upon rotation of said second gear.

8. In an apparatus for laying out a pattern upon an arcuate die workpiece mounted upon a rotatable shaft which includes means for physically applying the pattern to the workpiece, the improvement which comprises circumferential measuring means for automatically measuring foreshortened circumferential distances on the workpiece surface, said circumferential measuring means comprising a. A rotatable, elongated, tubular measuring member axially bearing a plurality of different distance scales about its circumference corresponding respectively to different degrees of circumferential foreshortening;

b. Indicator means for readout of distances along said axial scales; and c. motion transmitting means for traversing said indicator means axially of said measuring member to indicate design distances thereon in response to axial rotation of the arcuate die, said motion transmitting means including a sheave, gear means for transmitting rotation of said workpiece to said sheave, and cordage means connected to said indicator means in passing about said sheave, whereby said indicator means is caused to traverse said longitudinal measuring member in response to axial rotation of said workpiece.

* * * * *